US012772184B2

(12) United States Patent
Li et al.

(10) Patent No.: US 12,772,184 B2
(45) Date of Patent: Oct. 20, 2026

(54) COMMUNICATION METHOD, APPARATUS, AND SYSTEM, AND STORAGE MEDIUM

(71) Applicant: HUAWEI TECHNOLOGIES CO., LTD., Shenzhen (CN)

(72) Inventors: Jihong Li, Shenzhen (CN); Zhaogen Yin, Shenzhen (CN); Xi Han, Shenzhen (CN); Haisheng Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 18/755,941

(22) Filed: Jun. 27, 2024

(65) Prior Publication Data

US 2024/0349210 A1 Oct. 17, 2024

Related U.S. Application Data

(63) Continuation of application No. PCT/CN2022/141229, filed on Dec. 23, 2022.

(30) Foreign Application Priority Data

Dec. 31, 2021 (CN) ......................... 202111667548.8

(51) Int. Cl.
*H04W 56/00* (2009.01)

(52) U.S. Cl.
CPC ....... *H04W 56/001* (2013.01); *H04W 56/004* (2013.01)

(58) Field of Classification Search
None
See application file for complete search history.

(56) References Cited

U.S. PATENT DOCUMENTS

2009/0232113 A1 9/2009 Tamaki
2011/0176477 A1* 7/2011 Lee .................... H04B 7/15592 370/332

(Continued)

FOREIGN PATENT DOCUMENTS

CN 109714092 A 5/2019
CN 113131980 A 7/2021

(Continued)

OTHER PUBLICATIONS

International Search Report issued in corresponding International Application No. PCT/CN2022/141229, dated Mar. 22, 2023, pp. 1-9.

(Continued)

*Primary Examiner* — Minh Trang T Nguyen
(74) *Attorney, Agent, or Firm* — HAUPTMAN HAM, LLP

(57) ABSTRACT

A communication method includes receiving, by a first radio unit (RU), m device identifiers of m network devices sent by a first network device. The m network devices include the first network device, and the m network devices are connected to each other. The communication method also includes receiving, by the first RU, n device identifiers of n network devices sent by a second RU. The second RU is connected to the n network devices. The communication method further includes determining, by the first RU based on the m device identifiers and the n device identifiers, that a same device exists among the m network devices and the n network devices. The communication method additionally includes performing, by the first RU, cooperative communication processing. The cooperative communication processing is used to implement cooperative communication between the first RU and the second RU.

20 Claims, 7 Drawing Sheets

(56) References Cited

U.S. PATENT DOCUMENTS

| | | | | |
|---|---|---|---|---|
| 2012/0142345 | A1 * | 6/2012 | Choi | H04B 7/026 455/434 |
| 2017/0033951 | A1 | 2/2017 | Zhang et al. | |

FOREIGN PATENT DOCUMENTS

| | | | |
|---|---|---|---|
| CN | 114466364 | A | 5/2022 |
| EP | 2898753 | B1 | 4/2018 |
| JP | 2009225137 | A | 10/2009 |
| WO | 2017012635 | A1 | 1/2017 |
| WO | 2020152973 | A1 | 7/2020 |
| WO | 2021069254 | A1 | 4/2021 |

OTHER PUBLICATIONS

Extended European Search Report issued in corresponding European Application No. 22914509.9, dated Mar. 19, 2025, pp. 1-7.

Japanese Office Action issued in corresponding Japanese Application No. 2024-539725, dated Jun. 3, 2025, pp. 1-9.

* cited by examiner

COMMUNICATION METHOD, APPARATUS, AND SYSTEM, AND STORAGE MEDIUM

CROSS-REFERENCE TO RELATED APPLICATIONS

This application is a continuation of International Application No. PCT/CN2022/141229, filed on Dec. 23, 2022, which claims priority to Chinese Patent Application No. 202111667548.8, filed on Dec. 31, 2021. The disclosures of the aforementioned applications are hereby incorporated by reference in their entireties.

TECHNICAL FIELD

This application relates to the communication field, and in particular, to a communication method, apparatus, and system, and a storage medium.

BACKGROUND

In a multi-user multi-input multi-output (MU MIMO) service scenario, user equipments (UEs) are close, and each UE accesses a different radio unit (RU). Because signals sent by the RUs are co-channel signals, when a first UE and a second UE are close, the first UE receives signals that are sent by a plurality of RUs to the second UE.

It is assumed that the plurality of RUs include a first RU and a second RU. Due to reciprocity between a first channel and a second channel that are between the first RU and the second RU, the first channel includes a downlink channel of the first RU and an uplink channel of the second RU, the second channel includes a downlink channel of the second RU and an uplink channel of the first RU, so that at a location of the first UE, a signal sent by the first RU to the second UE and a signal sent by the second RU cancel each other. The reciprocity between the first channel and the second channel means that a latency characteristic and a frequency characteristic of the first channel are respectively consistent with a latency characteristic and a frequency characteristic of the second channel.

To make the first channel and the second channel reciprocal, the first RU and the second RU receive synchronization signals from a network. The first RU and the second RU perform cooperative communication with each other based on the synchronization signals received by the first RU and the second RU, and correct the first channel and the second channel based on a communication result. However, phases and frequencies of the synchronization signals received by the first RU and the second RU differ greatly. As a result, the communication result obtained by the first RU and the second RU based on the synchronization signals received by the first RU and the second RU has a great error, and it is difficult for the first channel and the second channel to be reciprocal.

SUMMARY

This application provides a communication method, apparatus, and system, and a storage medium, to make channels between a first RU and a second RU reciprocal. Technical solutions are as follows.

According to a first aspect, this application provides a communication method. In the method, a first radio unit RU receives device identifiers of m network devices sent by a first network device, where the m network devices include the first network device, the m network devices are connected to each other, and m is an integer greater than 0. The first RU receives device identifiers of n network devices sent by a second RU, where the second RU is connected to the n network devices, and n is an integer greater than 0. The first RU determines, based on the m device identifiers and the n device identifiers, that a same device exists among the m network devices and the n network devices. The first RU performs cooperative communication processing, where the cooperative communication processing is used to implement cooperative communication between the first RU and the second RU.

The first RU is connected to the m network devices, the second RU is connected to the n network devices, and the first RU determines, based on the device identifiers of the m network devices sent by the first network device and the device identifiers of the n network devices sent by the second RU, that the same device exists among the m network devices and the n network devices. Therefore, a network device directly connected to the first RU is the same as a network device directly connected to the second RU. Alternatively, a network device directly connected to the first RU is associated with a network device directly connected to the second RU. For example, the network device directly connected to the first RU and the network device directly connected to the second RU are in an upstream-downstream relationship, or there is a common upstream device between the network device directly connected to the first RU and the network device directly connected to the second RU. In this way, the first RU and the second RU perform the cooperative communication, so that channels between the first RU and the second RU may be reciprocal.

In a possible implementation, the first RU receives time synchronization information and/or frequency synchronization information sent by the first network device. The first RU performs channel correction processing based on the time synchronization information and/or the frequency synchronization information, where the channel correction processing is used to correct the channels between the first RU and the second RU. Because the same network device exists among the m network devices connected to the first RU and the n network devices connected to the second RU, a difference between the time synchronization information received by the first RU and time synchronization information received by the second RU is small, and a difference between the frequency synchronization information received by the first RU and frequency synchronization information received by the second RU is also small. In this way, the first RU performs the channel correction processing based on the received time synchronization information and/or frequency synchronization information, to improve channel correction precision.

In another possible implementation, the channels between the first RU and the second RU include a first channel and a second channel, the first channel includes a downlink channel of the first RU and an uplink channel of the second RU, and the second channel includes a downlink channel of the second RU and an uplink channel of the first RU. The first RU measures a latency difference between a transmission latency of the first channel and a transmission latency of the second channel based on the time synchronization information and/or the frequency synchronization information. The first RU performs the channel correction processing based on the latency difference. Because the difference between the time synchronization information received by the first RU and the time synchronization information received by the second RU is small, and the difference between the frequency synchronization information received by the first RU and the frequency synchronization information received by the second RU is also small, the first RU measures the latency difference based on the received time synchronization information and/or frequency synchronization information, to improve latency difference measurement precision and the channel correction precision.

In another possible implementation, the first RU compensates for the transmission latency of the first channel or the transmission latency of the second channel based on the latency difference. Alternatively, the first RU sends the latency difference to the second RU, where the latency difference is used to compensate for the transmission latency of the first channel or the transmission latency of the second channel. In this way, a plurality of channel correction manners are provided, that is, channel correction manners are enriched.

In another possible implementation, the first RU suppresses noise in the time synchronization information and/or noise in the frequency synchronization information. The noise in the two pieces of information is suppressed, so that the noise in the time synchronization information and/or an error that occurs in the frequency synchronization information can be eliminated.

In another possible implementation, the first RU receives, via the first network device, time synchronization information and/or frequency synchronization information sent by a second network device, where the second network device is an upstream device of the first network device. RUs connected to the second network device are more than RUs connected to the first network device. The first RU may use the time synchronization information and/or the frequency synchronization information sent by the second network device. In this way, a quantity of RUs in a cooperation group can be increased.

In another possible implementation, the first RU sends the m device identifiers to the second RU. In this way, the second RU determines, based on the received device identifiers, whether to perform cooperative communication with the first RU.

In another possible implementation, the first network device is a fronthaul device directly connected to the first RU.

In another possible implementation, the n network devices include the first network device, and the first network device is a fronthaul device directly connected to the second RU. Alternatively, the n network devices include a third network device, the third network device is a fronthaul device connected to the second RU, and the first network device is an upstream device of the third network device. In this way, it is ensured that a network device directly connected to the first RU is the same as a network device directly connected to the second RU, or a network device directly connected to the first RU is associated with a network device directly connected to the second RU.

In another possible implementation, the m network devices further include a second network device, the second network device is an upstream device of the first network device, the n network devices include the second network device, and the second network device is a fronthaul device directly connected to the second RU or an upstream device of a fronthaul device directly connected to the second RU. In this way, it is ensured that a network device directly connected to the first RU is associated with a network device directly connected to the second RU.

In another possible implementation, the first RU adds the second RU to a cooperation group, where RUs in the cooperation group are configured to perform cooperative communication. Because cooperative communication is performed between the RUs in the cooperation group, it is ensured that channels between the RUs in the cooperation group may be reciprocal.

In another possible implementation, a manner in which the first network device sends the m device identifiers includes a broadcast manner; and/or a manner in which the second RU sends the n device identifiers includes a broadcast manner.

In another possible implementation, the first network device is an Ethernet switching device.

According to a second aspect, this application provides a communication method. In the method, a first network device sends device identifiers of m network devices to a first radio unit RU. The m network devices include the first network device, the m network devices are connected to each other, and m is an integer greater than 0. The m device identifiers are used to trigger the first RU to perform cooperative communication processing, and the cooperative communication processing is used to implement cooperative communication between the first RU and a second RU. The second RU is connected to n network devices, n is an integer greater than 0, and a same device exists among the m network devices and the n network devices.

The first RU is connected to the m network devices, and the second RU is connected to the n network devices. Because the first network device sends the device identifiers of the m network devices to the first RU, the first RU determines, based on the device identifiers of the m network devices sent by the first network device and the device identifiers of the n network devices sent by the second RU, that the same device exists among the m network devices and the n network devices. Therefore, a network device directly connected to the first RU is the same as a network device directly connected to the second RU. Alternatively, a network device directly connected to the first RU is associated with a network device directly connected to the second RU. For example, the network device directly connected to the first RU and the network device directly connected to the second RU are in an upstream-downstream relationship, or there is a common upstream device between the network device directly connected to the first RU and the network device directly connected to the second RU. In this way, the first RU and the second RU perform the cooperative communication, so that channels between the first RU and the second RU may be reciprocal.

In a possible implementation, the first network device sends time synchronization information and/or frequency synchronization information to the first RU. In this way, the first RU may perform channel correction processing based on the time synchronization information and/or the frequency synchronization information. Because the same network device exists among the m network devices connected to the first RU and the n network devices connected to the second RU, a difference between time synchronization information received by the first RU and time synchronization information received by the second RU is small, and a difference between frequency synchronization information received by the first RU and frequency synchronization information received by the second RU is also small. In this way, the first RU performs the channel correction processing based on the received time synchronization information and/or frequency synchronization information, to improve channel correction precision.

In another possible implementation, the first network device filters noise in the time synchronization information and/or noise in the frequency synchronization information.

In this way, errors that occur in the time synchronization information and the frequency synchronization information are reduced.

In another possible implementation, the first network device is a fronthaul device directly connected to the first RU.

In another possible implementation, the m network devices further include a second network device, the second network device is an upstream device of the first network device, the n network devices include the second network device, and the second network device is a fronthaul device directly connected to the second RU or an upstream device of a fronthaul device directly connected to the second RU. In this way, it is ensured that a network device directly connected to the first RU is associated with a network device directly connected to the second RU.

In another possible implementation, the n network devices include the first network device, and the first network device is a fronthaul device connected to the second RU. Alternatively, the n network devices include the first network device and a third network device, the third network device is a fronthaul device connected to the second RU, and the first network device is an upstream device of the third network device. In this way, it is ensured that a network device directly connected to the first RU is the same as a network device directly connected to the second RU, or a network device directly connected to the first RU is associated with a network device directly connected to the second RU.

In another possible implementation, a manner in which the first network device sends the m device identifiers includes a broadcast manner.

According to a third aspect, this application provides a communication apparatus, configured to perform the method in any one of the first aspect or the possible implementations of the first aspect. Specifically, the apparatus includes a unit configured to perform the method in any one of the first aspect or the possible implementations of the first aspect.

According to a fourth aspect, this application provides a communication apparatus, configured to perform the method in any one of the second aspect or the possible implementations of the second aspect. Specifically, the apparatus includes a unit configured to perform the method in any one of the second aspect or the possible implementations of the second aspect.

According to a fifth aspect, this application provides a communication apparatus, including at least one processor and a memory. The at least one processor is configured to be coupled to the memory, and read and execute instructions in the memory, to implement the method in any one of the first aspect or the possible implementations of the first aspect.

According to a sixth aspect, this application provides a communication apparatus, including at least one processor and a memory. The at least one processor is configured to be coupled to the memory, and read and execute instructions in the memory, to implement the method in any one of the second aspect or the possible implementations of the second aspect.

According to a seventh aspect, this application provides a computer program product. The computer program product includes a computer program stored in a computer readable-storage medium, and the computer program is loaded by using a processor to implement the method in the first aspect, the second aspect, any one of the possible implementations of the first aspect, or any one of the possible implementations of the second aspect.

According to an eighth aspect, this application provides a computer-readable storage medium, configured to store a computer program. The computer program is loaded by using a processor to perform the method in the first aspect, the second aspect, any one of the possible implementations of the first aspect, or any one of the possible implementations of the second aspect.

According to a ninth aspect, this application provides a communication system. The system includes the apparatus according to the third aspect and the apparatus according to the fourth aspect, or the system includes the apparatus according to the fifth aspect and the apparatus according to the sixth aspect.

DESCRIPTION OF EMBODIMENTS

The following further describes the implementations of this application in detail with reference to the accompanying drawings.

Figure 1:
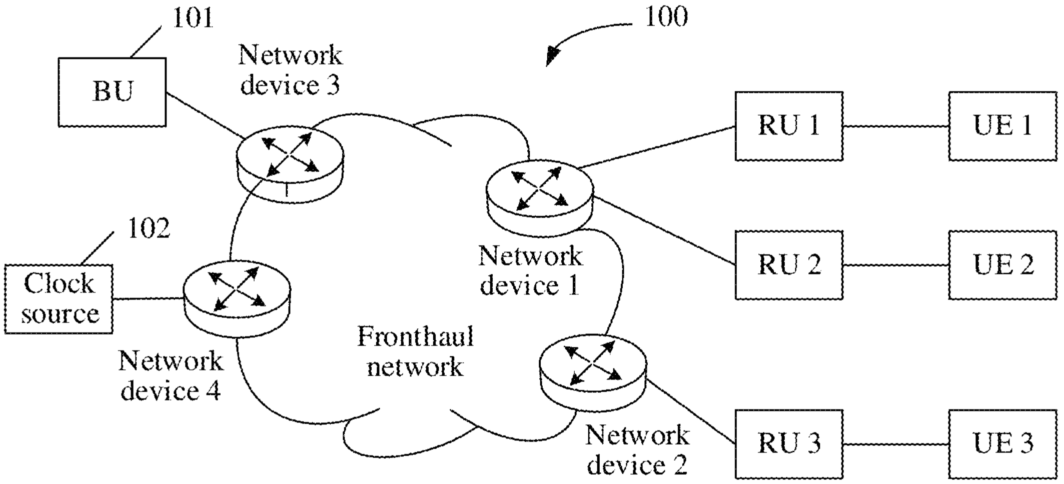
FIG. 1 is a schematic diagram of a network architecture according to an embodiment of this application.

Refer to FIG. 1. An embodiment of this application provides a network architecture 100. The network architecture 100 includes a plurality of RUs. The plurality of RUs are connected to a fronthaul network.

In some embodiments, for each of the plurality of RUs, the RU is connected to a network device in a fronthaul network, so that the RU is connected to the fronthaul network. The plurality of RUs may perform wireless communication with a UE, so that the UE is connected to a network via the plurality of RUS.

For example, as shown in FIG. 1, the plurality of RUs include an RU 1, an RU 2, and an RU 3. The RU 1, the RU 2, and the RU 3 perform wireless communication with a UE 1. Both the RU 1 and the RU 2 are directly connected to a network device 1 in the fronthaul network, and the RU 3 is directly connected to a network device 2 in the fronthaul network, so that the UE 1 is connected to the network. Similarly, a UE 2 and a UE 3 may also perform wireless communication with the RU 1, the RU 2, and the RU 3, so that the UE 2 and the UE 3 are connected to the network.

In some embodiments, the fronthaul network is an Ethernet, and the network device directly connected to the RU is an Ethernet switching device, for example, an Ethernet switch.

For any UE in the network architecture 100, the plurality of RUs in the network architecture 100 send signals to the UE. The UE may be close to at least one other UE. As a result, the UE may receive other signals in addition to the signals sent by the plurality of RUs to the UE, where the other signals are signals sent by the plurality of RUs to another UE.

For ease of description, the UE is referred to as a first UE, and another UE is referred to as a second UE. The plurality of RUs include a first RU and a second RU. Because the first UE and the second UE are close, the first UE receives first signals sent by the first RU and the second RU to the first UE, and can further receive second signals sent by the first RU and the second RU to the second UE. That is, the first RU may receive two first signals and two second signals.

Because the first signal and the second signal are co-channel signals, if the first signal and the second signal are not orthogonal, after the first UE receives the two first signals and the two second signals, the two second signals cause co-channel interference to the two first signals on the first UE. If the first signal and the second signal are orthogonal, after the first UE receives the two first signals and the two second signals, phases of the two first signals are superposed on the first UE, and phases of the two second signals are canceled. In this way, co-channel interference caused by the two second signals to the two first signals is avoided.

Figure 2:
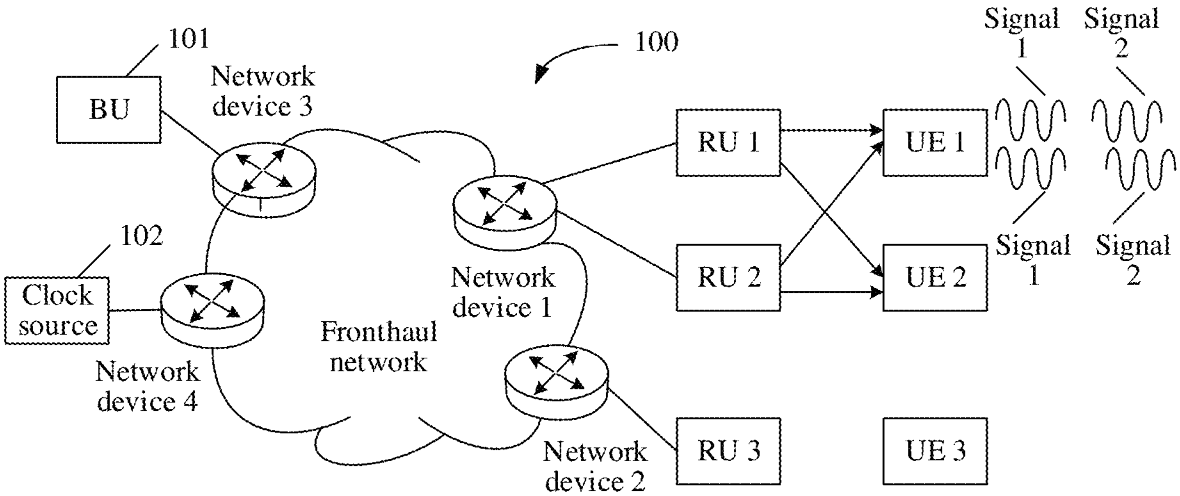
FIG. 2 is a schematic diagram of another network architecture according to an embodiment of this application.

For example, as shown in FIG. 2, it is assumed that the UE 1 and the UE 2 are close, the RU 1 and the RU 2 each send a signal 1 to the UE 1, and the RU 1 and the RU 2 each send a signal 2 to the UE 2. In addition to receiving the two signals 1, the UE 1 can receive the two signals 2, where the signal 1 and the signal 2 are co-channel signals. In addition to receiving the two signals 2, the UE 2 can receive the two signals 1.

If the signal 1 and the signal 2 are not orthogonal, the signal 2 on the UE 1 causes co-channel interference to the signal 1, and the signal 1 on the UE 2 causes co-channel interference to the signal 2.

If the signal 1 and the signal 2 are orthogonal, peak locations of the two signals 1 are the same and trough locations of the two signals 1 are the same on the UE 1, so that phases of the two signals 1 are superposed. On the UE 1, a trough location of the signal 2 sent by the RU 1 is the same as a peak location of the signal 2 sent by the RU 2, and a peak location of the signal 2 sent by the RU 1 is the same as a trough location of the signal 2 sent by the RU 2, as shown in FIG. 2. In this way, phases of the two signals 2 are canceled, so that the signal 2 does not cause co-channel interference to the signal 1 on the UE 1.

To make the first signal orthogonal to the second signal, a first channel and a second channel between the first RU and the second RU need to be reciprocal. The first channel includes a downlink channel of the first RU and an uplink channel of the second RU, and the second channel includes a downlink channel of the second RU and an uplink channel of the first RU. When the first channel and the second channel are reciprocal, the first signal sent by the first RU and the second signal sent by the second RU are orthogonal.

In some embodiments, the downlink channel of the first RU includes a transmit channel of the first RU, the uplink channel of the second RU includes a receive channel of the second RU, the downlink channel of the second RU includes a transmit channel of the second RU, and the uplink channel of the second RU includes a receive channel of the second RU.

To make the first channel and the second channel between the first RU and the second RU reciprocal, the first RU performs cooperative communication processing. The cooperative communication processing is used to implement cooperative communication between the first RU and the second RU.

In some embodiments, the cooperative communication processing includes channel correction processing, and the channel correction processing is used to correct the first channel and the second channel between the first RU and the second RU. In some embodiments, the first RU and the second RU correct the first channel and the second channel between the first RU and the second RU through the channel correction processing. In this way, the channels between the first RU and the second RU are reciprocal.

The first RU includes a local clock, and the second RU includes a local clock. If the local clock of the first RU and the local clock of the second RU satisfy a first specified condition, the first RU and the second RU may accurately correct the first channel and the second channel between the first RU and the second RU through the channel correction processing. In this way, the first channel and the second channel are reciprocal, and channel correction precision is improved. If the local clock of the first RU and the local clock of the second RU do not satisfy the first specified condition, the first RU and the second RU cannot accurately correct the first channel and the second channel between the first RU and the second RU through the channel correction processing. Consequently, the first channel and the second channel cannot be reciprocal.

In some embodiments, the first specified condition includes that a time difference between a current timing moment of the local clock of the first RU and a current timing moment of the local clock of the second RU is less than a specified time difference threshold. Therefore, if the local clock of the first RU and the local clock of the second RU satisfy the first specified condition, a difference between the local clock of the first RU and the local clock of the second RU is small. If the local clock of the first RU and the local clock of the second RU do not satisfy the first specified condition, there is a great difference between the local clock of the first RU and the local clock of the second RU.

In embodiments of this application, the first RU receives first synchronization information sent by the network device in the fronthaul network, where the first synchronization information includes first time synchronization information and/or first frequency synchronization information; and synchronizes the local clock of the first RU based on the first synchronization information. The second RU receives second synchronization information sent by the network device in the fronthaul network, where the second synchronization information includes second time synchronization information and/or second frequency synchronization information; and synchronizes the local clock of the second RU based on the second synchronization information. The first synchronization information and the second synchronization information may be information sent by a same network device, or may be information sent by two different network devices.

If the first synchronization information and the second synchronization information satisfy a second specified condition, a synchronized local clock of the first RU and a synchronized local clock of the second RU satisfy the first specified condition. If the first synchronization information and the second synchronization information do not satisfy the second specified condition, the synchronized local clock of the first RU and the synchronized local clock of the second RU do not satisfy the first specified condition.

The second specified condition includes one or more of the following conditions:

An information difference between the first synchronization information and the second synchronization information does not exceed a specified difference, or neither noise in the first synchronization information nor noise in the second synchronization information exceeds a specified noise threshold.

The first synchronization information includes the first time synchronization information and/or the first frequency synchronization information, and the second synchronization information includes the second time synchronization information and/or the second frequency synchronization information.

For the network device that sends the first synchronization information, the network device includes a local clock, the first time synchronization information includes a timing moment of the local clock of the network device, and the first frequency synchronization information includes a working frequency of the local clock of the network device.

For the network device that sends the second synchronization information, the network device includes a local clock, the second time synchronization information includes a timing moment of the local clock of the network device, and the second frequency synchronization information includes a working frequency of the local clock of the network device.

In some embodiments, the information difference between the first synchronization information and the second synchronization information includes a time difference between the first time synchronization information and the second time synchronization information and/or a frequency difference between the first frequency synchronization information and the second frequency synchronization information.

In some embodiments, that an information difference between the first synchronization information and the second synchronization information does not exceed a specified difference includes: The time difference between the first time synchronization information and the second time synchronization information does not exceed a specified time difference threshold; and/or the frequency difference between the first frequency synchronization information and the second frequency synchronization information does not exceed a specified frequency difference threshold. Optionally, the specified time difference threshold and the specified frequency difference threshold are small. For example, the specified time difference threshold and/or the specified frequency difference threshold are/is 0.

In some embodiments, that neither noise in the first synchronization information nor noise in the second synchronization information exceeds a specified noise threshold includes: Neither the noise in the first time synchronization information nor the noise in the second time synchronization information exceeds a first specified noise threshold; and/or neither the noise in the first frequency synchronization information nor the noise in the second frequency synchronization information exceeds a second specified noise threshold. The first specified noise threshold and the second specified noise threshold may or may not be equal.

Refer to FIG. 1. The network architecture 100 further includes a base station unit (BU) 101 and/or a clock source 102. The BU 101 and/or the clock source 102 send/sends synchronization information to the fronthaul network. For each network device in the fronthaul network, when receiving the synchronization information, the network device synchronizes a local clock of the network device based on the received synchronization information, generates new synchronization information based on a synchronized local clock, and sends the new synchronization information.

In some embodiments, if the first RU and the second RU are close, when the first RU and the second RU are deployed, the first RU and the second RU are connected to a same network device as much as possible, or the first RU and the second RU are connected to two associated network devices. In this way, the first synchronization information received by the first RU and the second synchronization information received by the second RU satisfy the second specified condition.

For m network devices connected to the first RU and n network devices connected to the second RU, when a same device exists among the m network devices and the n network devices, the first RU and the second RU are connected to a same network device: or the first RU and the second RU are connected to two associated network devices, where both m and n are integers greater than 0.

In some embodiments, in the following several cases, the same device exists among the m network devices and the n network devices.

Figure 3:
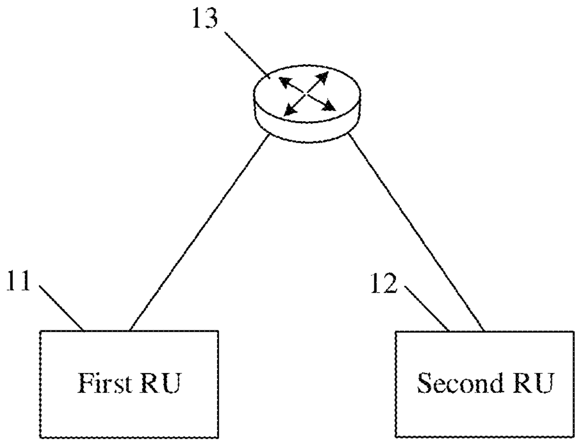
FIG. 3 is a schematic diagram of another network architecture according to an embodiment of this application.

Case 1: Refer to FIG. 3. Both m network devices connected to a first RU 11 and n network devices connected to a second RU 12 include a first network device 13. The first network device 13 is a fronthaul device directly connected to the first RU 11, and is also a fronthaul device directly connected to the second RU 12.

Figure 4:
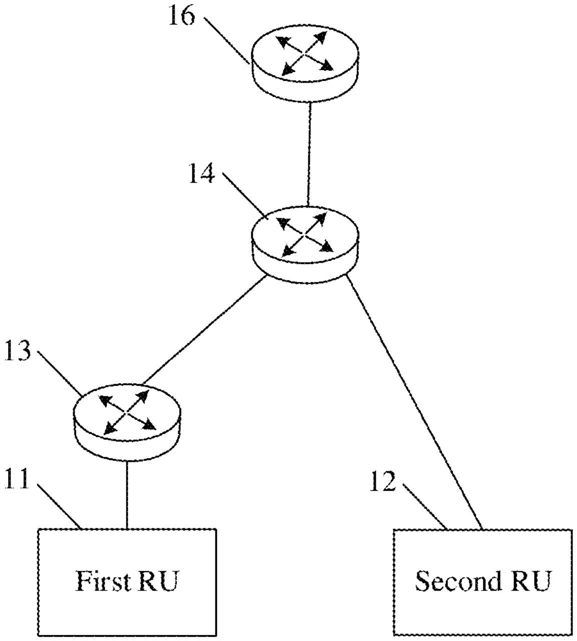
FIG. 4 is a schematic diagram of another network architecture according to an embodiment of this application.

Case 2: Refer to FIG. 4. m network devices connected to a first RU 11 include a first network device 13 and a second network device 14. The first network device 13 is a fronthaul device directly connected to the first RU 11, and the second network device 14 is an upstream device of the first network device 14. n network devices connected to a second RU 12 include the second network device 14. The second network device 14 is a fronthaul device directly connected to the second RU 12. In Case 2, the first network device 13 is associated with the second network device 14. Optionally, the m network devices may further include a fourth network device 16 and the like. The n network devices may further include the fourth network device 16 and the like. The fourth network device 16 is an upstream device of the second network device 14.

Figure 5:
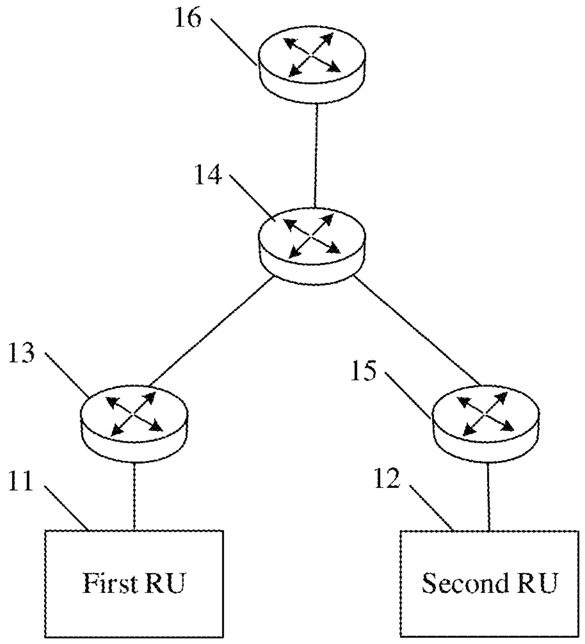
FIG. 5 is a schematic diagram of another network architecture according to an embodiment of this application.

Case 3: Refer to FIG. 5. m network devices connected to a first RU 11 include a first network device 13 and a second network device 14. The first network device 13 is a fronthaul device directly connected to the first RU 11, and the second network device 14 is an upstream device of the first network device 13. n network devices connected to a second RU 12 include a third network device 15 and the second network device 14. The third network device 15 is a fronthaul device directly connected to the second RU 12, and the second network device 14 is also an upstream device of the third network device 15. In Case 3, the first network device 13 is associated with the third network device 15. Optionally, the m network devices may further include a fourth network device 16 and the like. The n network devices may further include the fourth network device 16 and the like. The fourth network device 16 is an upstream device of the second network device 14.

Only Case 1 to Case 3 are listed above. Certainly, there may be other cases during actual implementation, and other cases are not listed one by one herein.

For a network device connected to an RU, the term “connection” herein includes a direct connection and an indirect connection. If the RU is directly connected to the network device, the network device and the RU do not need to be connected via another network device. For example, as shown in FIG. 4 and FIG. 5, the first RU 11 is connected to the first network device 13 without using another network device, that is, the first RU 11 is directly connected to the first network device 13.

If an RU is indirectly connected to a network device, the RU and the network device need to be connected via one or more other network devices. For example, as shown in FIG. 4 or FIG. 5, the first RU 11 and the fourth network device 16 need to be connected via the second network device 14, that is, the first RU 11 is indirectly connected to the fourth network device 16.

For the foregoing upstream device, for example, the upstream device of the first network device 13, the upstream device is a network device through which a path between the first network device 13 and the BU 101 passes, or a network device through which a path between the first network device 13 and the clock source of the fronthaul network passes. Therefore, compared with the first network device 13, the upstream device of the first network device 13 is closer to the BU 102 or the clock source 102.

Optionally, the BU in embodiments of this application includes a building baseband unit (BBU), a distributed unit (DU), and a central unit (CU) or another network element or apparatus having a baseband signal processing function and/or a radio unit control and management function. The RU in embodiments of this application may also be referred to as a radio frequency unit, and includes a remote radio unit (RRU), an active antenna unit (AAU), or another network element or apparatus that has a capability of processing a radio frequency signal, an intermediate frequency signal, or an intermediate radio frequency signal. Certainly, with development of technologies and evolution of system architectures, a network of another standard may also appear. In this case, the BU and the RU may be classified or named in another manner. In other words, the system architecture described in embodiments of this application is intended to describe the technical solutions in embodiments of this application more clearly, but does not constitute a limitation on the technical solutions provided in embodiments of this application. With evolution of the system architectures, the technical solutions provided in embodiments of this application are also applicable to similar technical problems. The fronthaul network in embodiment of this application is a transmission network configured to connect the BU and the RU.

Figure 6:
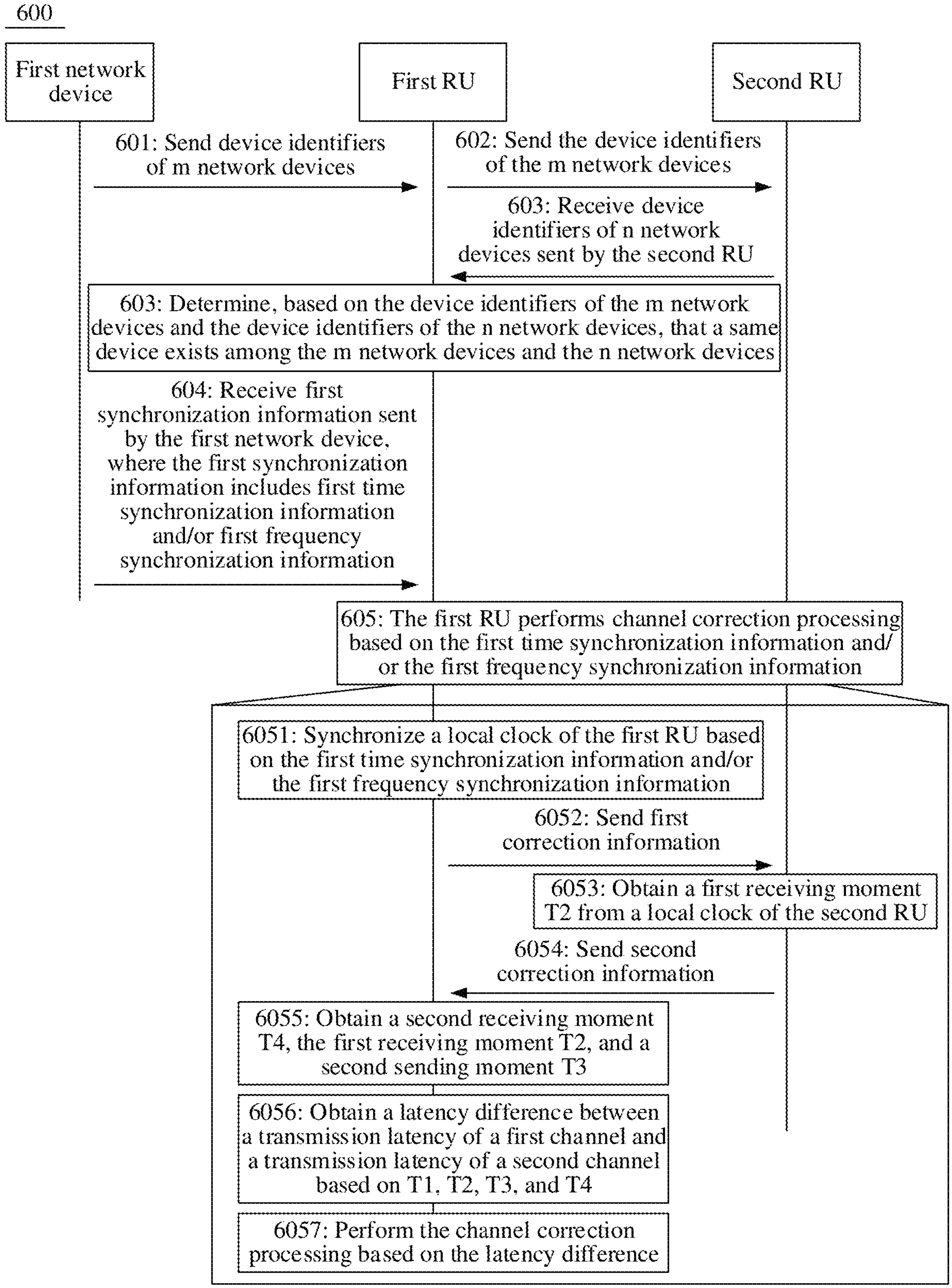
FIG. 6 is a flowchart of a communication method according to an embodiment of this application.

Refer to FIG. 6. An embodiment of this application provides a communication method 600. The communication method 600 is applied to the network architecture 100 shown in FIG. 1, or the network architecture shown in FIG. 3, FIG. 4, or FIG. 5, and includes the following steps.

Step 601: A first network device sends device identifiers of m network devices to a first RU, where the m network devices include the first network device, the m network devices are connected to each other, and m is an integer greater than 0.

The first RU is any RU in the foregoing network architecture, and the m network devices are network devices connected to the first RU.

In some embodiments, the first network device is a fronthaul device directly connected the first RU. When m is equal to 1, the m network devices are the first network device. When m is greater than 1, the m network devices further include an upstream device of the first network device.

In some embodiments, the first network device sends, in a broadcast manner, the device identifiers of the m network devices to each RU connected to the first network device.

The first network device periodically sends the device identifiers of the m network devices, or the first network device randomly sends the device identifiers of the m network devices, or the first network device sends the device identifiers of the m network devices when detecting that a new RU is connected to the first network device. Certainly, there may be other manners of triggering the first network device to send the device identifiers of the m network devices, which are not described one by one herein.

For another RU other than the first RU, a network device connected to the another RU also performs the operation of step 601 as the first network device. For ease of description, the another RU is referred to as a second RU. For a network device connected to the second RU, the network device sends device identifiers of n network devices to the second RU, where n is an integer greater than 0, the n network devices include the network device, and the n network devices are connected to the second RU.

Several examples are listed below to describe this step. The several examples are as follows:

Example 1: Refer to FIG. 3. Both m and n are equal to 1, and the first network device 13 sends a device identifier “ID13” of the first network device 13 to the first RU 11, and sends the device identifier “ID13” of the first network device 13 to the second RU 12.

Example 2: Refer to FIG. 4. The first network device 13 sends device identifiers of the m network devices to the first RU 11, where the device identifiers of the m network devices include a device identifier “ID13” of the first network device 13. Optionally, the device identifiers of the m network devices may further include a device identifier “ID14” of the second network device 14 and/or a device identifier “ID16” of the fourth network device 16. The second network device 14 sends device identifiers of the n network devices to the second RU 12, where the device identifiers of the n network devices include the device identifier “ID14” of the second network device 14. Optionally, the device identifiers of the n network devices may further include the device identifier “ID16” of the fourth network device 16.

Example 3: Refer to FIG. 5. The first network device 13 sends device identifiers of the m network devices to the first RU 11, where the device identifiers of the m network devices include a device identifier “ID13” of the first network device 13. Optionally, the device identifiers of the m network devices may further include a device identifier “ID14” of the second network device 14 and/or a device identifier “ID16” of the fourth network device 16. The third network device 15 sends device identifiers of the n network devices to the second RU 12. The device identifiers of the n network devices include a device identifier “ID15” of the third network device 15. Optionally, the device identifiers of the n network devices may further include the device identifier "ID16" of the fourth network device 16.

Figure 7:
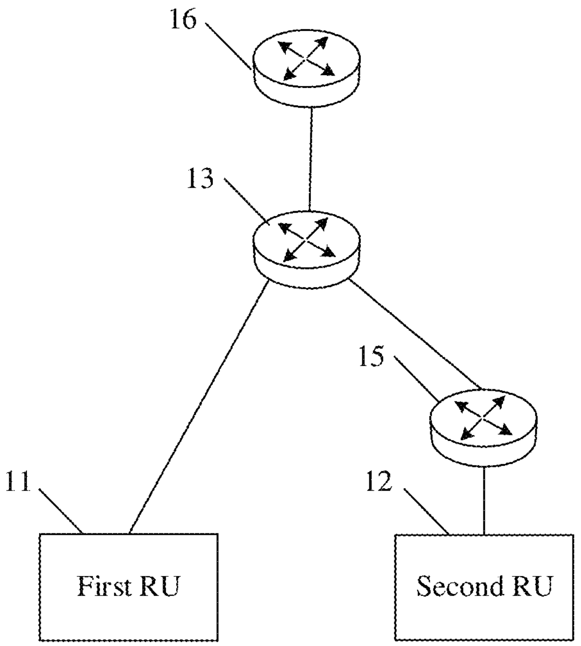
FIG. 7 is a schematic diagram of another network architecture according to an embodiment of this application.

Example 4: Refer to FIG. 7. A first network device 13 sends device identifiers of m network devices to a first RU 11, where the device identifiers of the m network devices include a device identifier "ID13" of the first network device 13. Optionally, the device identifiers of the m network devices may further include a device identifier "ID16" of a fourth network device 16. A third network device 15 sends device identifiers of n network devices to a second RU 12, where the device identifiers of the n network devices include a device identifier "ID15" of the third network device 15. Optionally, the device identifiers of the n network devices may further include the device identifier "ID13" of the first network device 13 and/or the device identifier "ID16" of the fourth network device 16. The first network device 13 is an upstream device of the fourth network device 16.

Step 602: The first RU receives the device identifiers of the m network devices, and sends the device identifiers of the m network devices to the another RU other than the first RU.

In some embodiments, the another RU other than the first RU includes a neighboring RU of the first RU.

In step 602, the first RU sends, in a broadcast manner, the device identifiers of the m network devices to the another RU other than the first RU.

The another RU other than the first RU also performs the operations in step 602 as the first RU. In other words, another RU may send the device identifiers of the network devices to the first RU.

For example, in the foregoing Example 1 to Example 4, a neighboring RU of the second RU includes the first RU. After receiving the device identifiers of the n network devices, the second RU sends the device identifiers of the n network devices to the neighboring RU of the second RU in a broadcast manner.

Step 603: The first RU receives the device identifiers of the n network devices sent by the second RU, and determines, based on the device identifiers of the m network devices and the device identifiers of the n network devices, that a same device exists among the m network devices and the n network devices.

When determining that the same device exists among the m network devices and the n network devices, the first RU adds the second RU to a cooperation group, where the cooperation group includes the first RU and the second RU, and then performs step 604.

In step 603, the first RU compares the device identifiers of the m network devices with the device identifiers of the n network devices. If a same device identifier exists among the device identifiers of the m network devices and the device identifiers of the n network devices, it is determined that the same device exists among the m network devices and the n network devices. If it is learned through comparison that no same device identifier exists among the device identifiers of the m network devices and the device identifiers of the n network devices, it is determined that no same device exists among the m network devices and the n network devices.

In some embodiments, an operation of adding, by the first RU, the second RU to the cooperation group is as follows: The first RU sets a label for the second RU, where the label identifies the cooperation group. Alternatively, the first RU adds a device identifier of the second RU to a device identifier set, where the device identifier set includes device identifiers of RUs in a same cooperation group.

In addition to the second RU, the neighboring RU of the first RU may further include another RU. The first RU continues to perform the operation in step 603 to add the another RU to the cooperation group. RUs in a same cooperation group are connected to a same network device, or are connected to associated network devices.

For example, for Example 1, the device identifiers of the m network devices received by the first RU 11 include the device identifier "ID13" of the first network device 13, and the device identifiers of the n network devices received by the first RU 11 include the device identifier "ID13" of the first network device 13. The same device identifier "ID13" exists among the device identifiers of the m network devices and the device identifiers of the n network devices. Therefore, the first RU 11 adds the second RU 12 to the cooperation group.

For Example 2, it is assumed that the device identifiers of the m network devices received by the first RU 11 include the device identifier "ID13" of the first network device 13, the device identifier "ID14" of the second network device 14, and the device identifier "ID16" of the fourth network device. It is assumed that the device identifiers of the n network devices received by the first RU 11 include the device identifier "ID14" of the second network device and the device identifier "ID16" of the fourth network device 16. The same device identifiers "ID14" and "ID16" exist among the device identifiers of the m network devices and the device identifiers of the n network devices. Therefore, the first RU 11 adds the second RU 12 to the cooperation group.

For Example 3, it is assumed that the device identifiers of the m network devices received by the first RU 11 include the device identifier "ID13" of the first network device 13, the device identifier "ID14" of the second network device 14, and the device identifier "ID16" of the fourth network device. It is assumed that the device identifiers of the n network devices received by the first RU 11 include the device identifier "ID15" of the third network device, the device identifier "ID14" of the second network device 14, and the device identifier "ID16" of the fourth network device. The same device identifiers "ID14" and "ID16" exist among the device identifiers of the m network devices and the device identifiers of the n network devices. Therefore, the first RU 11 adds the second RU 12 to the cooperation group.

For Example 4, it is assumed that the device identifiers of the m network devices received by the first RU 11 include the device identifier "ID13" of the first network device 13 and the device identifier "ID16" of the fourth network device. It is assumed that the device identifiers of the n network devices received by the first RU 11 include the device identifier "ID15" of the third network device, the device identifier "ID13" of the first network device 13, and the device identifier "ID16" of the fourth network device. The same device identifiers "ID13" and "ID16" exist among the device identifiers of the m network devices and the device identifiers of the n network devices. Therefore, the first RU 11 adds the second RU 12 to the cooperation group.

For any RU other than the first RU in the cooperation group, the RU is still referred to as the second RU, and for the second RU, the first RU performs cooperative communication processing, where the cooperative communication processing is used to implement cooperative communication between the first RU and the second RU. The cooperative communication herein means that the first RU and the second RU cooperate to communicate with a UE. In some embodiments, the cooperative communication processing may be performed through operations in the following step 604 and step 605.

In some embodiments, the cooperative communication processing includes channel correction processing and the like, and the channel correction processing is used to correct channels between the first RU and the second RU.

Step 604: The first RU receives first synchronization information sent by the first network device, where the first synchronization information includes first time synchronization information and/or first frequency synchronization information.

In some embodiments, the first time synchronization information and the first frequency synchronization information are generated by the first network device. The first network device includes a local clock, and the first network device generates the first time synchronization information and/or the first frequency synchronization information by using the local clock. Optionally, the first time synchronization information includes a timing moment of the local clock. For example, the first time synchronization information includes a current timing moment of the local clock. The first frequency synchronization information includes a working frequency of the local clock.

The first network device also receives third synchronization information sent by the upstream device of the first network device, and synchronizes the local clock of the first network device based on the third synchronization information.

During implementation, the third synchronization information includes third time synchronization information and/or third frequency synchronization information, the third time synchronization information includes a timing moment of a clock of the upstream device, and the third frequency synchronization information includes a working frequency of the clock of the upstream device. The first network device obtains a transmission latency of the third synchronization information, and performs time synchronization on the local clock of the first network device based on the transmission latency and the third synchronization information, so that the current timing moment of the local clock of the first network device is synchronized with a current timing moment of the clock of the upstream device; and/or, the first network device performs frequency synchronization on the local clock of the first network device based on the third frequency synchronization information, so that the working frequency of the local clock of the first network device is synchronized with the working frequency of the clock of the upstream device.

A BU or a clock source of a fronthaul network sends synchronization information to the fronthaul network. For any network device in the fronthaul network, after receiving the synchronization information, the network device synchronizes a local clock based on the synchronization information as the first network device; and then generates synchronization information based on a synchronized local clock, and sends the generated synchronization information.

In some embodiments, the first synchronization information is generated by the upstream device of the first network device, the first network device receives the first synchronization information sent by the upstream device, and sends the first synchronization information to the first RU. That is, the first RU receives, via the first network device, the first time synchronization information and/or the first frequency synchronization information sent by the upstream device of the first network device.

Similarly, for the second RU in the same cooperation group, the second RU also receives second synchronization information sent by the network device connected to the second RU, where the second synchronization information includes second time synchronization information and/or second frequency synchronization information.

It should be noted that the first RU and the second RU are in the same cooperation group. For the network device connected to the second RU, the first network device connected to the first RU and the network device may be a same network device, or the first network device may be associated with the network device. Therefore, a difference between the local clock of the first network device and a local clock of the network device is very small, and the local clock of the first network device is synchronized or basically synchronized with the local clock of the network device. Therefore, an information difference between the first synchronization information sent by the first network device and the second synchronization information sent by the network device does not exceed a specified difference. In some embodiments, a time difference between the first time synchronization information and the second time synchronization information does not exceed a specified time difference threshold; and/or a frequency difference between the first frequency synchronization information and the second frequency synchronization information does not exceed a specified frequency difference threshold.

In some embodiments, before sending the first time synchronization information and/or the first frequency synchronization information, the first network device further filters noise in the first time synchronization information and/or noise in the first frequency synchronization information.

In a process of transmitting the first time synchronization information and/or the first frequency synchronization information, the noise is generated in the first time synchronization information and/or the first frequency synchronization information. Therefore, after receiving the first synchronization information, the first RU suppresses noise in the first synchronization information. That is, after receiving the first time synchronization information, the first RU suppresses the noise in the first time synchronization information; and/or after receiving the first frequency synchronization information, the first RU suppresses the noise in the first frequency synchronization information.

The noise in the first time synchronization information includes error information in the first time synchronization information, and the first frequency synchronization information includes error information in the first frequency synchronization information. Therefore, the noise in the first time synchronization information can be suppressed to eliminate the error information in the first time synchronization information, and the noise in the first frequency synchronization information can be suppressed to eliminate the error information in the first frequency synchronization information.

In some embodiments, the first RU includes an interface chip or a filter. The first RU filters the noise in the first time synchronization information by using the interface chip or the filter, to suppress the noise in the first time synchronization information; and/or, the first RU filters the noise in the first frequency synchronization information by using the interface chip or the filter, to suppress the noise in the first frequency synchronization information.

The first network device sends the first time synchronization information and/or the first frequency synchronization information by using a signal. The first time synchronization information is carried on a time synchronization signal, and the first frequency synchronization information is carried on a frequency synchronization signal. The time synchronization signal includes the noise in the first time synchronization information, and the frequency synchronization signal includes the noise in the first frequency synchronization information. Therefore, the first network device or the first RU filters the noise in the time synchronization signal, to filter the noise in the first time synchronization information, and the first network device or the first RU filters the noise in the frequency synchronization signal, to filter the noise in the first frequency synchronization information.

After receiving the second synchronization information, the second RU suppresses noise in the second synchronization information. That is, after receiving the second time synchronization information, the second RU suppresses noise in the second time synchronization information; and/or after receiving the second frequency synchronization information, the second RU suppresses noise in the second frequency synchronization information.

Neither noise in the first synchronization information that is obtained through suppression by the first RU nor noise in the second synchronization information that is obtained through suppression by the second RU exceeds a specified noise threshold. In some embodiments, neither the noise in the first time synchronization information nor the noise in the second time synchronization information exceeds a first specified noise threshold; and/or neither the noise in the first frequency synchronization information nor the noise in the second frequency synchronization information exceeds a second specified noise threshold.

In some embodiments, the information difference between the first synchronization information in the first RU and the second synchronization information in the second RU does not exceed the specified difference, and neither the noise in the first synchronization information in the first RU nor the noise in the second synchronization information in the second RU exceeds the specified noise threshold. That is, the first synchronization information in the first RU and the second synchronization information in the second RU satisfy the foregoing second specified condition.

Step 605: The first RU performs the channel correction processing based on the first time synchronization information and/or the first frequency synchronization information.

The channels between the first RU and the second RU include a first channel and a second channel, the first channel includes a downlink channel of the first RU and an uplink channel of the second RU, and the second channel includes a downlink channel of the second RU and an uplink channel of the first RU.

In step 605, the first RU measures a latency difference between a transmission latency of the first channel and a transmission latency of the second channel based on the first time synchronization information and/or the first frequency synchronization information. The first RU performs the channel correction processing based on the latency difference.

In some embodiments, the first RU performs the channel correction processing through the following operations in 6051 to 6057, where the operations in 6051 to 6057 are as follows:

6051: The first RU synchronizes a local clock of the first RU based on the first time synchronization information and/or the first frequency synchronization information.

In 6051, the first RU obtains a transmission latency of the first time synchronization information, and performs time synchronization on the local clock of the first RU based on the first time synchronization information and the transmission latency of the first time synchronization information; and/or the first RU performs frequency synchronization on the local clock of the first RU based on the first frequency synchronization information.

Figure 8:
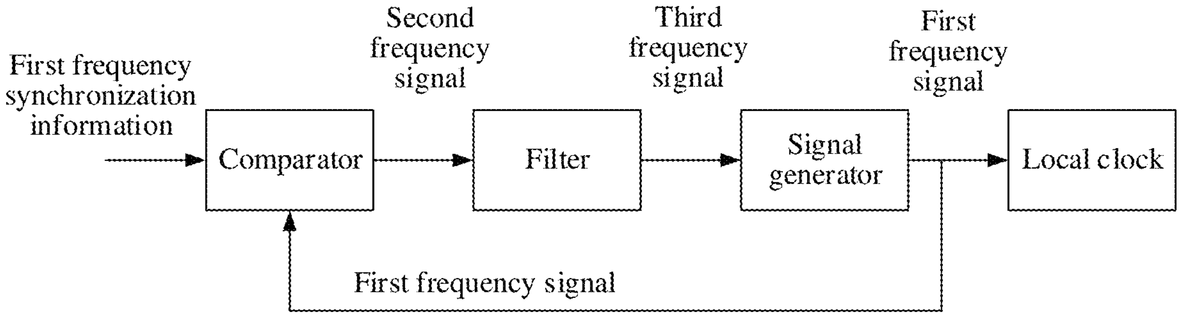
FIG. 8 is a schematic diagram of a structure of an RU according to an embodiment of this application.

Refer to FIG. 8. The first RU includes a comparator, a filter, a signal generator, and the like. The filter is separately connected to the comparator and the signal generator, and the signal generator is further connected to the local clock and the comparator of the first RU. The signal generator is configured to generate a first frequency signal, and input the first frequency signal to the local clock of the first RU. The local clock of the first RU performs timing based on the first frequency signal, that is, the first frequency signal is a working frequency of the local clock of the first RU.

In some embodiments, an operation of performing, by the first RU, the frequency synchronization on the local clock of the first RU based on the first frequency synchronization information is as follows: The comparator receives the first frequency signal input by the signal generator: compares the first frequency synchronization information received by the first RU with a frequency of the first frequency signal to obtain a frequency difference, where the frequency difference is a frequency difference between the first frequency synchronization information and the frequency; and inputs a second frequency signal to the filter, where a frequency of the second frequency signal is equal to the frequency difference.

The filter filters the second frequency signal to obtain a third frequency signal, and inputs the third frequency signal to the signal generator. The signal generator compensates, based on the third frequency signal, for the first frequency signal generated by the signal generator, and inputs the first frequency signal that is compensated for to the local clock of the first RU.

In some embodiments, the comparator includes a phase detector (PD) and the like, the filter includes a low-pass filter (LPF) and the like, and the signal generator includes a voltage controlled crystal oscillator (VCXO) and the like.

Similarly, the second RU obtains a transmission latency of the second time synchronization information, and performs time synchronization on a local clock of the second RU based on the second time synchronization information and the transmission latency of the second time synchronization information; and/or, the second RU performs frequency synchronization on the local clock of the second RU based on the second frequency synchronization information.

The first synchronization information and the second synchronization information satisfy the second specified condition. In some embodiments, the time difference between the first time synchronization information and the second time synchronization information does not exceed the specified time difference threshold, and the frequency difference between the first frequency synchronization information and the second frequency synchronization information does not exceed the specified frequency difference threshold. In this way, the first RU performs the frequency synchronization on the local clock of the first RU based on the first frequency synchronization information, and the second RU performs the frequency synchronization on the local clock based on the second frequency synchronization information, so that a frequency difference between the working frequency of the local clock of the first RU and a working frequency of the local clock of the second RU does not exceed a specified frequency difference threshold. The frequency difference between the working frequency of the local clock of the first RU and the working frequency of the local clock of the second RU may also be referred to as a frequency offset, and the frequency offset does not exceed the specified frequency difference threshold.

The first RU performs the time synchronization on the local clock of the first RU based on the first time synchronization information, and the second RU performs the time synchronization on the local clock based on a second frequency synchronization information. In addition, because the frequency offset between the local clock of the first RU and the local clock of the second RU does not exceed the specified frequency difference threshold, a time difference between a current timing moment of the local clock of the first RU and a current timing moment of the local clock of the second RU does not exceed a specified time difference threshold. Therefore, a synchronized local clock of the first RU and a synchronized local clock of the second RU satisfy the foregoing first specified condition. In some embodiments, the time difference between the current timing moment of the local clock of the first RU and the current timing moment of the local clock of the second RU is less than the specified time difference threshold.

6052: The first RU sends first correction information to the second RU, and obtains a first sending moment T1 from the local clock of the first RU, where the first sending moment T1 is a moment at which the first correction information is sent.

The first RU sends the first correction information to the second RU through the downlink channel of the first RU.

6053: The second RU receives the first correction information, and obtains a first receiving moment T2 from the local clock of the second RU, where the first receiving moment T2 is a moment at which the first correction information is received.

The second RU receives, through the uplink channel of the second RU, the first correction information sent by the first RU.

6054: The second RU sends second correction information to the first RU.

The second RU sends the second correction information through the uplink channel of the second RU.

In 6054, the second RU obtains a second sending moment T3 from the local clock of the second RU, where the second sending moment T3 is a moment at which the second RU sends the second correction information.

In some embodiments, the second correction information includes the first receiving moment T2 and the second sending moment T3. Alternatively, the second RU sends the first receiving moment T2 and the second sending moment T3 to the first RU.

6055: The first RU receives the second correction information, and obtains a second receiving moment T4, the first receiving moment T2, and the second sending moment T3, where the second receiving moment T4 is a moment at which the second correction information is received.

In 6055, when receiving the second correction information, the first RU obtains the second receiving moment T4 from the local clock of the first RU. The second correction information includes the first receiving moment T2 and the second sending moment T3. The first RU obtains the first receiving moment T2 and the second sending moment T3 from the second correction information. Alternatively, the first RU receives the first receiving moment T2 and the second sending moment T3 sent by the second RU.

6056: The first RU obtains the latency difference between the transmission latency of the first channel and the transmission latency of the second channel based on T1, T2, T3, and T4.

The transmission latency of the first channel is equal to T2−T1, the transmission latency of the second channel is equal to T4−T3, and the latency difference between the transmission latency of the first channel and the transmission latency of the second channel is equal to (T2−T1)−(T4−T3).

Because the time difference between the current timing moment of the local clock of the first RU and the current timing moment of the local clock of the second RU is less than the specified time difference threshold, T1, T2, T3, and T4 that are obtained are accurate, and precision of obtaining the latency difference is improved, to improve channel correction precision.

6057: The first RU performs the channel correction processing based on the latency difference.

In some embodiments, the first RU compensates for the transmission latency of the first channel or the transmission latency of the second channel based on the latency difference, so that the transmission latency of the first channel is equal to the transmission latency of the second channel, to perform the channel correction processing on the first channel and the second channel. In this way, the first channel and the second channel are reciprocal.

In some embodiments, the first RU sends the latency difference to the second RU, and the second RU compensates for the transmission latency of the first channel or the transmission latency of the second channel based on the latency difference, so that the transmission latency of the first channel is equal to the transmission latency of the second channel, to perform the channel correction processing on the first channel and the second channel. In this way, the first channel and the second channel are reciprocal.

The first RU completes the channel correction processing, the first RU and the second RU communicate with a first UE, and the first RU and the second RU communicate with a second UE. In addition to receiving signals sent by the first RU and the second RU to the first UE, the first UE can further receive signals sent by the first RU and the second RU to the second UE. However, on the first UE, the signals sent by the first RU and the second RU to the second UE are canceled. Similarly, in addition to receiving signals sent by the first RU and the second RU to the second UE, the second UE can further receive signals sent by the first RU and the second RU to the first UE. However, on the second UE, the signals sent by the first RU and the second RU to the first UE are canceled. In this way, the first RU and the second RU can cooperatively communicate with the UE.

In this embodiment of this application, the first RU is connected to the m network devices, the second RU is connected to the n network devices, and the first RU determines, based on the device identifiers of the m network devices sent by the first network device and the device identifiers of the n network devices sent by the second RU, that the same device exists among the m network devices and the n network devices. When it is determined that the same device exists among the m network devices and the n network devices, it may be learned that a network device directly connected to the first RU is the same as a network device directly connected to the second RU, or a network device directly connected to the first RU is associated with a network device directly connected to the second RU. For example, the network device directly connected to the first RU and the network device directly connected to the second RU are in an upstream-downstream relationship, or there is a same upstream device between the network device directly connected to the first RU and the network device directly connected to the second RU. In this way, the first RU enables the first synchronization information received by the first RU and the second synchronization information received by the second RU to satisfy the foregoing second specified condition. The first RU synchronizes the local clock of the first RU based on the first synchronization information, and the second RU synchronizes the local clock of the second RU based on the second synchronization information, so that a difference between the local clock of the first RU and the local clock of the second RU is small and close to 0. In this way, the first RU and the second RU perform cooperative communication, that is, the first RU and the second RU perform channel correction to improve the channel correction precision, so that the channels between the first RU and the second RU are reciprocal.

Figure 9:
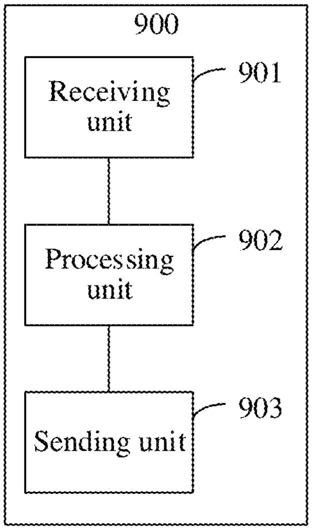
FIG. 9 is a schematic diagram of a structure of a communication apparatus according to an embodiment of this application.

Refer to FIG. 9. An embodiment of this application provides a communication apparatus 900. The apparatus 900 is deployed on the RU in any one of the foregoing embodiments, for example, deployed on the RU 1, the RU 2, or the RU 3 in the network architecture shown in FIG. 1 or FIG. 2, or deployed on the first RU or the second RU in the embodiment shown in FIG. 3, FIG. 4, FIG. 5, FIG. 6, or FIG. 7. The apparatus 900 includes:

a receiving unit 901, configured to receive device identifiers of m network devices sent by a first network device, where the m network devices include a first network device, the m network devices are connected to each other, and m is an integer greater than 0, where the receiving unit 901 is further configured to receive device identifiers of n network devices sent by a second RU, where the second RU is connected to the n network devices, and n is an integer greater than 0; and a processing unit 902, configured to determine, based on the m device identifiers and the n device identifiers, that a same device exists among the m network devices and the n network devices, where the processing unit 902 is further configured to perform cooperative communication processing, where the cooperative communication processing is used to implement cooperative communication between the apparatus 900 and the second RU.

Optionally, for a detailed implementation process in which the receiving unit 901 receives the m device identifiers and the n device identifiers, refer to related content in step 601 to step 603 in the method 600 shown in FIG. 6, and details are not described herein again.

Optionally, for a detailed implementation process in which the processing unit 902 determines the same device and performs the cooperative communication processing, refer to related content in step 604 and step 605 in the method 600 shown in FIG. 6, and details are not described herein again.

Optionally, the receiving unit 901 is further configured to receive time synchronization information and/or frequency synchronization information sent by the first network device.

The processing unit 902 is configured to perform channel correction processing based on the time synchronization information and/or the frequency synchronization information, where the channel correction processing is used to correct channels between the apparatus 900 and the second RU.

Optionally, for a detailed implementation process in which the receiving unit 901 receives the time synchronization information and/or the frequency synchronization information, refer to related content in step 604 in the method 600 shown in FIG. 6, and details are not described herein again.

Optionally, for a detailed implementation process in which the processing unit 902 performs the channel correction processing, refer to related content in step 605 in the method 600 shown in FIG. 6, and details are not described herein again.

Optionally, the channels between the apparatus 900 and the second RU include a first channel and a second channel, the first channel includes a downlink channel of the apparatus 900 and an uplink channel of the second RU, and the second channel includes a downlink channel of the second RU and an uplink channel of the apparatus 900.

The processing unit 902 is configured to measure a latency difference between a transmission latency of the first channel and a transmission latency of the second channel based on the time synchronization information and/or the frequency synchronization information, and perform the channel correction processing based on the latency difference.

Optionally, for a detailed implementation process in which the processing unit 902 measures the latency difference, refer to related content in steps 6051 to 6056 in the method 600 shown in FIG. 6, and details are not described herein again.

Optionally, the processing unit 902 is configured to compensate for the transmission latency of the first channel or the transmission latency of the second channel based on the latency difference.

Optionally, for a detailed implementation process in which the processing unit 902 compensates for the transmission latency of the first channel or the transmission latency of the second channel, refer to related content in step 6057 in the method 600 shown in FIG. 6, and details are not described herein again.

Optionally, the apparatus 900 further includes a sending unit 903.

The sending unit 903 is configured to send the latency difference to the second RU, where the latency difference is used to compensate for the transmission latency of the first channel or the transmission latency of the second channel.

Optionally, the processing unit 902 is further configured to suppress noise in the time synchronization information and/or noise in the frequency synchronization information.

Optionally, for a detailed implementation process in which the processing unit 902 suppresses the noise, refer to related content in step 604 in the method 600 shown in FIG. 6, and details are not described herein again.

Optionally, the receiving unit 901 is configured to receive, via the first network device, time synchronization information and/or frequency synchronization information sent by a second network device, where the second network device is an upstream device of the first network device.

Optionally, for a detailed implementation process in which the receiving unit 901 receives the time synchronization information and/or the frequency synchronization information, refer to related content in step 604 in the method 600 shown in FIG. 6, and details are not described herein again.

Optionally, the first network device is a fronthaul device directly connected to the apparatus 900.

Optionally, the n network devices include the first network device, and the first network device is a fronthaul device directly connected to the second RU; or the n network devices include a third network device, the third network device is a fronthaul device connected to the second RU, and the first network device is an upstream device of the third network device.

Optionally, the m network devices further include the second network device. The second network device is the upstream device of the first network device, the n network devices include the second network device, and the second network device is a fronthaul device directly connected to the second RU or an upstream device of a fronthaul device directly connected to the second RU.

Optionally, the processing unit 902 is further configured to add the second RU to a cooperation group, where an RU in the cooperation group is configured to perform the cooperative communication.

Optionally, for a detailed implementation process in which the processing unit 902 adds the second RU to the cooperation group, refer to related content in step 603 in the method 600 shown in FIG. 6, and details are not described herein again.

Optionally, a manner in which the first network device sends the m device identifiers includes a broadcast manner; and/or a manner in which the second RU sends the n device identifiers includes a broadcast manner.

In this embodiment of this application, the apparatus is connected to the m network devices, the second RU is connected to the n network devices, and the processing unit determines, based on the device identifiers of the m network devices sent by the first network device and the device identifiers of the n network devices sent by the second RU, that the same device exists among the m network devices and the n network devices. Therefore, the network device directly connected to the apparatus is the same as the network device directly connected to the second RU, or the network device directly connected to the apparatus is associated with the network device directly connected to the second RU. The processing unit performs the cooperative communication with the second RU. In this way, the channels between the apparatus and the second RU may be reciprocal.

Figure 10:
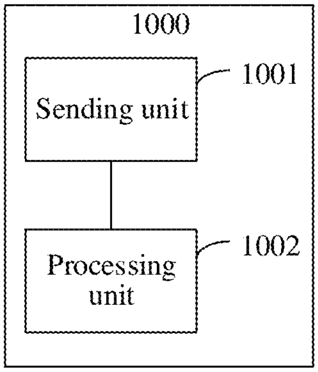
FIG. 10 is a schematic diagram of a structure of another communication apparatus according to an embodiment of this application.

Refer to FIG. 10. An embodiment of this application provides a communication apparatus 1000. The apparatus 1000 is deployed on the network device in any one of the foregoing embodiments, for example, deployed on the network device (for example, the network device 1, the network device 2, . . . ) in the network architecture shown in FIG. 1 or FIG. 2, or deployed on the first network device, the second network device, or the third network device in the embodiment shown in FIG. 3, FIG. 4, FIG. 5, FIG. 6, or FIG. 7. The apparatus 1000 includes:

- a sending unit 1001, configured to send device identifiers of m network devices to a first radio unit RU. The m network devices include the apparatus 1000, the m network devices are connected to each other, m is an integer greater than 0, the m device identifiers are used to trigger the first RU to perform cooperative communication processing, the cooperative communication processing is used to implement cooperative communication between the first RU and a second RU, the second RU is connected to n network devices, n is an integer greater than 0, and a same device exists among the m network devices and the n network devices.

Optionally, for a detailed implementation process in which the sending unit 1001 sends the device identifiers of the m network devices, refer to related content in step 601 in the method 600 shown in FIG. 6, and details are not described herein again.

Optionally, the sending unit 1001 is further configured to send time synchronization information and/or frequency synchronization information to the first RU.

Optionally, for a detailed implementation process in which the sending unit 1001 sends the time synchronization information and/or the frequency synchronization information, refer to related content in step 604 in the method 600 shown in FIG. 6, and details are not described herein again.

Optionally, the apparatus 1000 further includes a processing unit 1002.

The processing unit 1002 is configured to filter noise in the time synchronization information and/or noise in the frequency synchronization information.

Optionally, for a detailed implementation process in which the processing unit 1002 filters the noise, refer to related content in step 604 in the method 600 shown in FIG. 6, and details are not described herein again.

Optionally, the apparatus 1000 is a fronthaul device connected to the first RU.

Optionally, the m network devices further include a second network device. The second network device is an upstream device of the apparatus 1000. The n network devices include the second network device. The second network device is a fronthaul device directly connected to the second RU or an upstream device of a fronthaul device directly connected to the second RU.

Optionally, the n network devices include the apparatus 1000, and the apparatus is a fronthaul device connected to the second RU: or

- the n network devices include the apparatus 1000 and a third network device, the third network device is a fronthaul device connected to the second RU, and the apparatus 1000 is an upstream device of the third network device.

Optionally, a manner in which the sending unit 1001 sends the m device identifiers includes a broadcast manner.

In this embodiment of this application, the first RU is connected to the m network devices, and the second RU is connected to the n network devices. Because a transceiver unit sends the device identifiers of the m network devices to the first RU, the first RU determines, based on the device identifiers of the m network devices sent by the transceiver unit and the device identifiers of the n network devices sent by the second RU, that the same device exists among the m network devices and the n network devices. Therefore, a network device directly connected to the first RU is the same as a network device directly connected to the second RU, or a network device directly connected to the first RU is associated with a network device directly connected to the second RU. In this way, the first RU and the second RU perform the cooperative communication, so that channels between the first RU and the second RU may be reciprocal.

Figure 11:
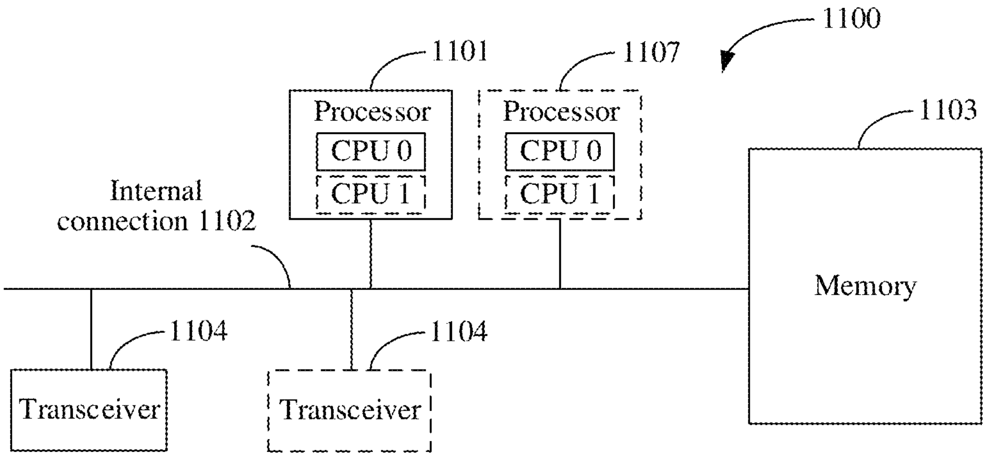
FIG. 11 is a schematic diagram of a structure of another communication apparatus according to an embodiment of this application.

Refer to FIG. 11. An embodiment of this application provides a schematic diagram of a communication apparatus 1100. The apparatus 1100 may be the RU in any one of the foregoing embodiments. For example, the apparatus 1100 may be the RU 1, the RU 2, or the RU 3 in the network architecture shown in FIG. 1 or FIG. 2, or the first RU or the second RU in the embodiment shown in FIG. 3, FIG. 4, FIG. 5, FIG. 6, or FIG. 7. The apparatus 1100 includes at least one processor 1101, an internal connection 1102, a memory 1103, and at least one transceiver 1104.

The apparatus 1100 is an apparatus of a hardware structure, and may be configured to implement function modules in the apparatus 900 shown in FIG. 9. For example, a person skilled in the art may figure out that the processing unit 902 in the apparatus 900 shown in FIG. 9 may be implemented by the at least one processor 1101 by invoking code in the memory 1103, and the receiving unit 901 and the sending unit 903 in the apparatus 900 shown in FIG. 9 may be implemented by the transceiver 1104.

Optionally, the apparatus 1100 may be further configured to implement a function of the RU (for example, the first RU) in any one of the foregoing embodiments.

Optionally, the processor 1101 may be a general-purpose central processing unit (CPU), a network processor (NP), a microprocessor, an application-specific integrated circuit (ASIC), or one or more integrated circuits configured to control program execution of the solutions in this application.

The internal connection 1102 may include a path for transmitting information between the foregoing components. Optionally, the internal connection 1102 is a board, a bus, or the like.

The transceiver 1104 is configured to communicate with another device or a communication network.

The memory 1103 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another disc storage, an optical disc storage (include a compact disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by a computer, but the memory is not limited thereto. The memory may exist independently, and is connected to the processor through a bus. The memory and the processor may also be integrated.

The memory 1103 is configured to store application program code for executing the solutions in this application, and the processor 1101 controls execution of the application program code. The processor 1101 is configured to execute the application program code stored in the memory 1103, and cooperate with the at least one transceiver 1104, to enable the apparatus 1100 to implement functions of the method in this patent.

During specific implementation, in an embodiment, the processor 1101 may include one or more CPUs, for example, a CPU 0 and a CPU 1 in FIG. 11.

During specific implementation, in an embodiment, the apparatus 1100 may include a plurality of processors, for example, the processor 1101 and a processor 1107 in FIG. 11. Each of these processors may be a single-CPU processor, or may be a multi-CPU processor. The processor herein may be one or more devices, circuits, and/or processing cores configured to process data (for example, computer program instructions).

Figure 12:
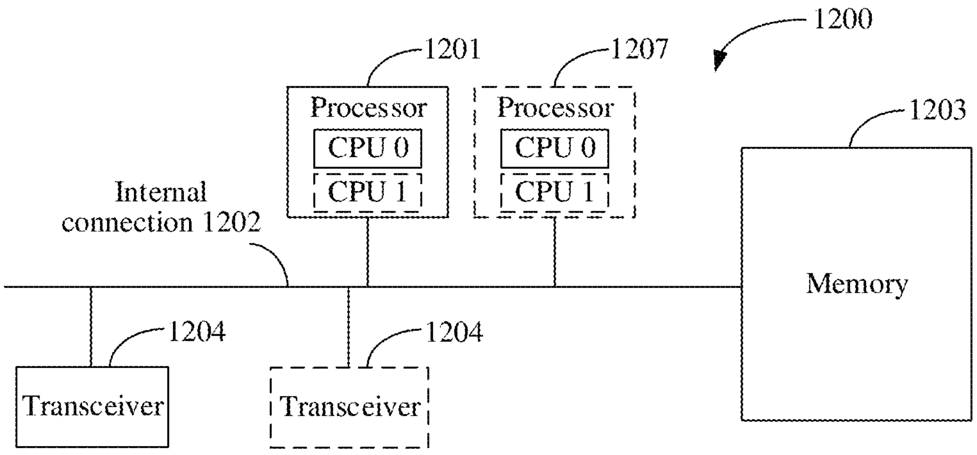
FIG. 12 is a schematic diagram of a structure of another communication apparatus according to an embodiment of this application.

Refer to FIG. 12. An embodiment of this application provides a schematic diagram of a communication apparatus 1200. The apparatus 1200 may be the network device in any one of the foregoing embodiments. For example, the apparatus 1200 may be the network device (for example, the network device 1, the network device 2, . . . ) in the network architecture shown in FIG. 1 or FIG. 2, or the first network device, the second network device, the third network device, or the like in the embodiment shown in FIG. 3, FIG. 4, FIG. 5, FIG. 6, or FIG. 7. The apparatus 1200 includes at least one processor 1201, an internal connection 1202, a memory 1203, and at least one transceiver 1204.

The apparatus 1200 is an apparatus of a hardware structure, and may be configured to implement function modules in the apparatus 1000 shown in FIG. 10. For example, a person skilled in the art may figure out that the processing unit 1002 in the apparatus 1000 shown in FIG. 10 may be implemented by the at least one processor 1201 by invoking code in the memory 1203, and the sending unit 1001 in the apparatus 1000 shown in FIG. 10 may be implemented by the transceiver 1204.

Optionally, the apparatus 1200 may be further configured to implement functions of the network device (for example, the first network device) in any one of the foregoing embodiments.

Optionally, the processor 1201 may be a general-purpose central processing unit (CPU), a network processor (NP), a microprocessor, an application-specific integrated circuit (ASIC), or one or more integrated circuits configured to control program execution of the solutions in this application.

The internal connection 1202 may include a path for transmitting information between the foregoing components. Optionally, the internal connection 1202 is a board, a bus, or the like.

The transceiver 1204 is configured to communicate with another device or a communication network.

The memory 1203 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another disc storage, an optical disc storage (include a compact disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by a computer, but the memory is not limited thereto. The memory may exist independently, and is connected to the processor through a bus. The memory and the processor may also be integrated.

The memory 1203 is configured to store application program code for executing the solutions in this application, and the processor 1201 controls execution of the application program code. The processor 1201 is configured to execute the application program code stored in the memory 1203, and cooperate with the at least one transceiver 1204, to enable the apparatus 1200 to implement functions of the method in this patent.

During specific implementation, in an embodiment, the processor 1201 may include one or more CPUs, for example, a CPU 0 and a CPU 1 in FIG. 12.

During specific implementation, in an embodiment, the apparatus 1200 may include a plurality of processors, for example, the processor 1201 and a processor 1207 in FIG. 12. Each of these processors may be a single-CPU processor, or may be a multi-CPU (multi-CPU) processor. The processor herein may be one or more devices, circuits, and/or processing cores configured to process data (for example, computer program instructions).

Figure 13:
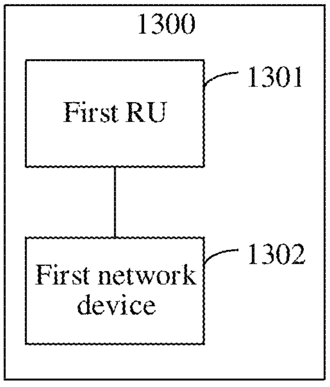
FIG. 13 is a schematic diagram of a structure of a communication system according to an embodiment of this application.

Refer to FIG. 13. An embodiment of this application provides a communication system 1300. The system 1300 includes the apparatus 900 shown in FIG. 9 and the apparatus 1000 shown in FIG. 10. Alternatively, the system 1300 includes the apparatus 1100 shown in FIG. 11 and the apparatus 1200 shown in FIG. 12.

Optionally, the apparatus 900 shown in FIG. 9 or the apparatus 1100 shown in FIG. 11 is a first RU 1301, and the apparatus 1000 shown in FIG. 10 or the apparatus 1200 shown in FIG. 12 is a first network device 1302.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A communication method, comprising:

receiving, by a first radio unit (RU), m device identifiers of m network devices sent by a first network device, wherein the m network devices comprise the first network device, the m network devices are connected to each other, and m is an integer greater than 0;

receiving, by the first RU, n device identifiers of n network devices sent by a second RU, wherein the second RU is connected to the n network devices, and n is an integer greater than 0;

determining, by the first RU based on the m device identifiers and the n device identifiers, that a same device exists among the m network devices and the n network devices; and performing, by the first RU, cooperative communication processing, wherein the cooperative communication processing is used to implement cooperative communication between the first RU and the second RU.

2. The communication method according to claim 1, wherein the performing, by the first RU, the cooperative communication processing comprises:

receiving, by the first RU, one or more of time synchronization information or frequency synchronization information sent by the first network device; and performing, by the first RU, channel correction processing based on the one or more of the time synchronization information or the frequency synchronization information, wherein the channel correction processing is used to correct channels between the first RU and the second RU.

3. The communication method according to claim 2, wherein the channels between the first RU and the second RU comprise a first channel and a second channel, the first channel comprises a downlink channel of the first RU and an uplink channel of the second RU, and the second channel comprises a downlink channel of the second RU and an uplink channel of the first RU; and the performing, by the first RU, the channel correction processing based on the one or more of the time synchronization information or the frequency synchronization information comprises:

measuring, by the first RU, a latency difference between a transmission latency of the first channel and a transmission latency of the second channel based on the one or more of the time synchronization information or the frequency synchronization information; and performing, by the first RU, the channel correction processing based on the latency difference.

4. The communication method according to claim 3, wherein the performing, by the first RU, the channel correction processing based on the latency difference comprises:

compensating for, by the first RU, the transmission latency of the first channel or the transmission latency of the second channel based on the latency difference.

5. The communication method according to claim 2, wherein before the performing, by the first RU, the channel correction processing based on the one or more of the time synchronization information or the frequency synchronization information, the communication method further comprises:

suppressing, by the first RU, one or more of noise in the time synchronization information or noise in the frequency synchronization information.

6. The communication method according to claim 2, wherein the receiving, by the first RU, the one or more of the time synchronization information or the frequency synchronization information sent by the first network device comprises:

receiving, by the first RU by way of the first network device, the one or more of the time synchronization information or the frequency synchronization information sent by a second network device, wherein the second network device is an upstream device of the first network device.

7. The communication method according to claim 1, wherein the first network device is a fronthaul device directly connected to the first RU.

8. The communication method according to claim 7, wherein the n network devices comprise the first network device, and the first network device is a fronthaul device directly connected to the second RU; or the n network devices comprise a third network device, the third network device is a fronthaul device connected to the second RU, and the first network device is an upstream device of the third network device.

9. The communication method according to claim 7, wherein the m network devices further comprise the second network device, the second network device is an upstream device of the first network device, the n network devices comprise the second network device, and the second network device is a fronthaul device directly connected to the second RU or an upstream device of a fronthaul device directly connected to the second RU.

10. The communication method according to claim 8, further comprising:

adding, by the first RU, the second RU to a cooperation group, wherein RUs in the cooperation group are configured to perform cooperative communication.

11. The communication method according to claim 1, wherein at least one of the first network device sends the m device identifiers or the second RU sends the n device identifiers in a broadcast manner.

12. A communication method, wherein the method comprises:

sending, by a first network device, m device identifiers of m network devices to a first radio unit (RU), wherein the m network devices comprise the first network device, the m network devices are connected to each other, m is an integer greater than 0, the m device identifiers are used to trigger the first RU to perform cooperative communication processing, the cooperative communication processing implements cooperative communication between the first RU and a second RU, the second RU is connected to n network devices, n is an integer greater than 0, and a same device exists among the m network devices and the n network devices.

13. The communication method according to claim 12, further comprising:

sending, by the first network device, one or more of time synchronization information or frequency synchronization information to the first RU.

14. The communication method according to claim 13, wherein before the sending, by the first network device, the one or more of the time synchronization information or the frequency synchronization information to the first RU, the communication method further comprises:

filtering, by the first network device, one or more of noise in the time synchronization information or noise in the frequency synchronization information.

15. The communication method according to claim 12, wherein the first network device is a fronthaul device connected to the first RU.

16. The communication method according to claim 15, wherein the m network devices further comprise a second network device, the second network device is an upstream device of the first network device, the n network devices comprise the second network device, and the second network device is a fronthaul device directly connected to the second RU or an upstream device of a fronthaul device directly connected to the second RU.

17. The communication method according to claim 15, wherein the n network devices comprise the first network device, and the first network device is a fronthaul device connected to the second RU; or the n network devices comprise the first network device and a third network device, the third network device is a fronthaul device connected to the second RU, and the first network device is an upstream device of the third network device.

18. The communication method according to claim 12, wherein the first network device sends the m device identifiers in a broadcast manner.

19. The communication method according to claim 3, wherein the performing, by the first RU, the channel correction processing based on the latency difference comprises:

sending, by the first RU, the latency difference to the second RU, wherein the latency difference is used to compensate for the transmission latency of the first channel or the transmission latency of the second channel.

20. An apparatus, comprising:

a processor; and a memory having instructions stored therein that, when executed by the processor, cause the apparatus to:

cause a first radio unit (RU) to process m device identifiers of m network devices received from a first network device and n device identifiers of n network devices received from a second RU to determine, based on the m device identifiers and the n device identifiers, that a same device exists among the m network devices and the n network devices, wherein the m network devices comprise the first network device, the m network devices are connected to each other, m is an integer greater than 0, the second RU is connected to the n network devices, and n is an integer greater than 0; and cause the first RU to perform cooperative communication processing to implement a cooperative communication between the first RU and the second RU.

* * * * *